United States Patent [19]

Strutt

[11] Patent Number: 4,541,298
[45] Date of Patent: Sep. 17, 1985

[54] ADJUSTABLE STEERING COLUMN MOUNTING

[75] Inventor: Derek W. Strutt, Chelmsford, United Kingdom

[73] Assignee: Ford Motor Company, Dearborn, Mich.

[21] Appl. No.: 455,702

[22] Filed: Jan. 5, 1983

[30] Foreign Application Priority Data

Jan. 15, 1982 [GB] United Kingdom ............... 8201070

[51] Int. Cl.$^4$ ............................................. B62D 1/18
[52] U.S. Cl. .................................. 74/493; 74/89.17; 74/530; 280/775
[58] Field of Search ............... 74/493, 530, 531, 89.17; 280/775

[56] References Cited

U.S. PATENT DOCUMENTS

| | | | |
|---|---|---|---|
| 3,032,134 | 5/1962 | Banker | 74/493 X |
| 3,803,939 | 4/1974 | Schenten | 74/493 |
| 4,078,448 | 3/1978 | Naka | 74/530 X |
| 4,102,218 | 7/1978 | Naka et al. | 74/540 |
| 4,244,237 | 1/1981 | Sprunger | 74/493 |
| 4,307,626 | 12/1981 | Sanada et al. | 74/493 |

Primary Examiner—Allan D. Herrmann
Assistant Examiner—Joseph M. Rolnicki
Attorney, Agent, or Firm—Peter D. McDermott; Roger L. May

[57] ABSTRACT

A mounting for an adjustable steering column comprising a support (6) for rotatably carrying a column member, a bracket (1) carrying the support, the support (6) being movable relative to the bracket in two mutually perpendicular directions, two rack and pinions sets (16,17,18,19 and 22,23,24,25) connected between the bracket (1) and the support (6) such that movement of the support (6) relative to the bracket in each of the mutually perpendicular directions causes the pinions (18,19,24,25) to roll relative to their racks (16,17,22,23) of respective rack and pinion sets, and clamping means (32,36,38) for clamping the bracket to the support by increasing the frictional forces opposing the relative movement of the racks and the pinions.

7 Claims, 1 Drawing Figure

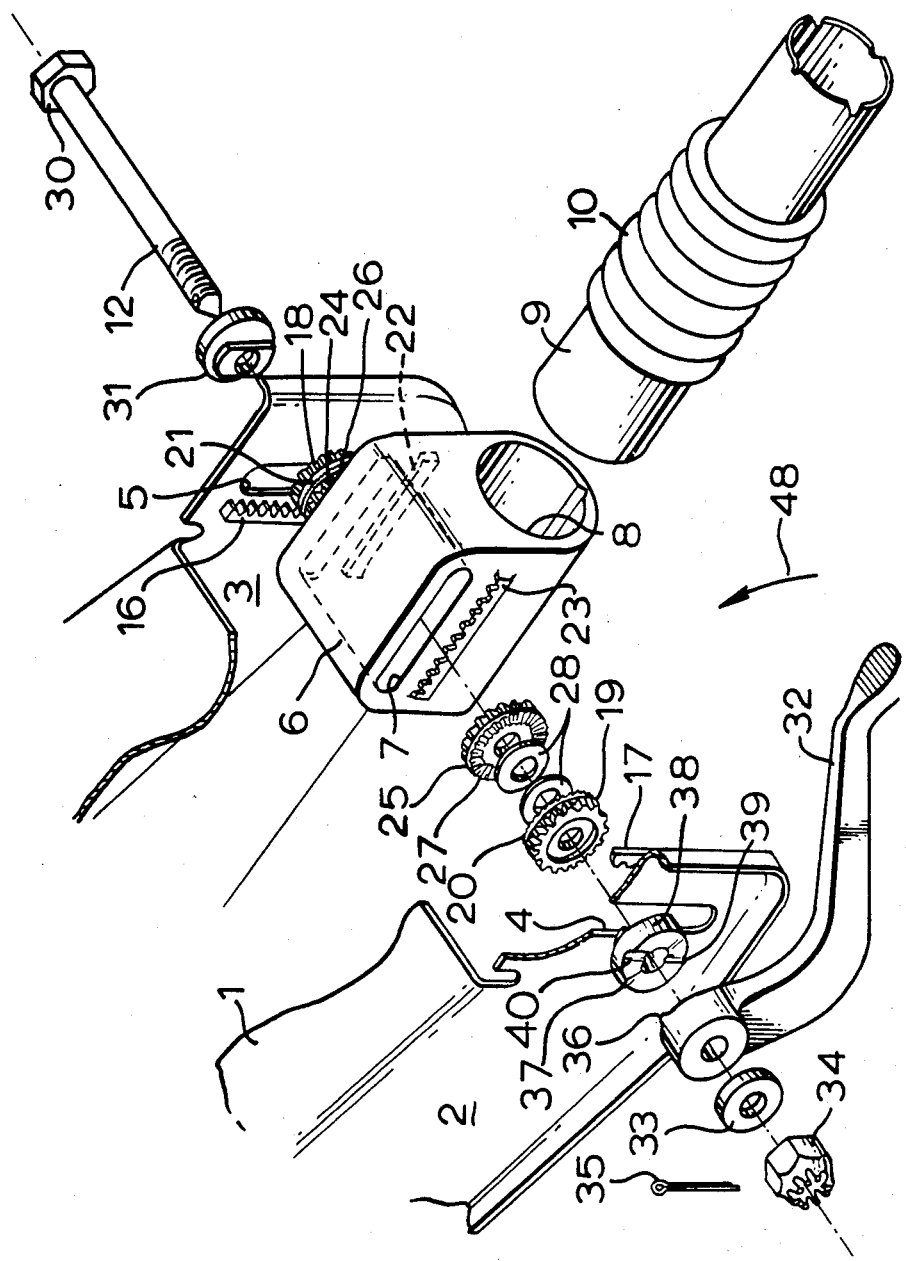

ADJUSTABLE STEERING COLUMN MOUNTING

BACKGROUND OF THE INVENTION

1. Field of the Invention

This invention relates to mountings for adjustable steering columns.

2. Description of the Prior Art

Mountings for adjustable steering columns usually comprise a support for rotatably carrying a steering column member, a bracket which carries the support and which allows the support to move relative to the bracket in two mutually perpendicular directions and clamping means for clamping the bracket to the support. Where such mountings are used in steering columns which incorporate a collapsable element for absorbing chest impact loads, a problem arises in ensuring that an adequate clamping force is provided to ensure that the support does not move relative to the bracket, under impact loads, thereby reducing the efficiency of the collapsable element.

SUMMARY OF THE INVENTION

According to the present invention, there is provided a mounting for an adjustable steering column comprising a support for rotatably carrying a column member, a bracket carrying the support, the support being movable relative to the bracket in two mutually perpendicular directions, and clamping means for clamping the bracket to the support, characterised in that two rack and pinion sets are connected between the bracket and the support such that movement of the support relative to the bracket in each of the mutually perpendicular directions causes the pinions to roll relative to racks of respective rack and pinion sets and in that the clamping means increases the frictional forces opposing the relative movement of the racks and pinions.

By providing rack and pinion sets between the support and the bracket and arranging the clamping means to increase the frictional forces opposing the relative movement of the racks and pinions, the clamping force on the support can be improved.

The frictional force opposing relative movement of the pinions and racks may be generated in two ways. First, a surface of the pinion of each rack and pinion set may be arranged to bear against surfaces on the bracket and/or the support, and the clamping means may be arranged to increase the frictional force between the pinions and the bracket and/or support. The contact between the surface of the pinion and the bracket and/or support may be direct or indirect, e.g. through the intermediary of a layer of friction material.

Alternatively, or additionally, surfaces of pinions of each rack and pinion set may be arranged to bear directly or indirectly against each other, clamping means being arranged to increase the frictional force between the pinions. In order to increase the frictional characteristics of the surfaces of the pinions, they are preferably provided with radial serrations. In order to ensure that the surfaces of the pinions disengage when the clamping means is released, the pinions are preferably biased away from each other, for example by spring washers. The frictional engagement between the pinions and the walls of the bracket are the support alone may be sufficient to provide the necessary force to prevent movement of the support relative to the bracket under impact loads, especially where supplemented by frictional engagement between the pinion themselves.

Frictional engagement between the pinions alone can however provide sufficient clamping force where each rack and pinion set includes two racks and two pinions and the pinions of at least one set are arranged to roll relative to their respective racks in opposite directions upon relative movement of the support and the bracket. This is achieved by providing two racks and two pinions in each rack and pinion set, and arranging them so that the pinions in each set roll in opposite directions relative to their respective racks upon relative movement of the support and the bracket. If sufficient force is applied to the two pairs of pinions to prevent relative rotation, the engagement of the pinions with the racks will prevent rotation thereof in either direction, thereby locking the support to the bracket.

BRIEF DESCRIPTION OF THE DRAWINGS

FIG. 1 illustrates an exploded perspective view a mounting for an adjustable steering column according to a preferred embodiment of the present invention.

DESCRIPTION OF THE PREFERRED EMBODIMENTS

A preferred embodiment of the invention will now be described, by way of example only, with reference to the accompanying drawing which is an "exploded" perspective view of a steering column mounting in accordance with the invention.

Referring to the drawing, a mounting for an adjustable steering column of a motor vehicle comprises a generally U-shaped bracket 1 of pressed steel having two side walls 2,3 in each of which is formed a vertical slot 4,5. A support 6 for a steering column is received between the two side walls 2,3 of the bracket 1. The support 6 is composed of die cast metal and has a transverse slot 7 extending perpendicularly to the slots 4,5 in the bracket 1.

A central passage 8 extends longitudinally through the support 6 and, when assembled into a steering column, receives a tubular element 9 forming a jacket for the steering column of the motor vehicle. The tubular element 9 has a corrugated portion 10 which is designed to collapse under axial impact loads, thereby absorbing forces applied to the steering column. A steering column carrying a steering wheel (not shown) is rotatably mounted in the tubular element 9 and extends through the central passage 8 in the support 6.

The support 6 is connected to the bracket 1 by means of a shaft 12 which projects through the mutually perpendicular slots 4,5,7 in the bracket 1 and the support 6 to allow the support 6 to slide relative to the bracket 1 in each of the two mutually perpendicular directions.

The relative movement of the support 6 and the bracket 1, is controlled by two rack and pinion sets. The first rack and pinion set comprises two racks 16,17 and two pinions 18,19. The two racks 16,17 are mounted on the inside surface of a respective one of the side walls 2,3, parallel to the slots 4,5 one rack, 16, being mounted forwardly of one slot 5, the other rack 17 being mounted rearwardly of the other slot 4. The two pinions 18,19 are rotatably mounted on the shaft 12 on opposite sides of the support 6 so that they mesh with respective ones of the racks 16,17 and their outer surfaces bear directly against the inner surfaces of the side walls 2,3 of the bracket 1. The inner end surfaces of the pinions 18,19 carry radial serrations 20,21.

The second rack and pinion set comprises two racks 22,23, and two pinions 24,25. The racks 22,23 are mounted on opposite sides of the support 6 immediately beneath the ends of the slot 7. (In an alternative arrangement (not shown) one rack 22 is mounted above slot 7 and the other rack is mounted below the slot 7). The two pinions 24,25 are rotatably mounted on the shaft 12 on opposite sides of the support 6 so that they mesh with respective ones of the racks 22,23 and their inner end surfaces bear directly against the side walls of the support 6. The outer end surfaces of the pinions 24,25 carry radial serrations 26,27 which bear against the radial serrations 20,21 on the inner end surfaces of the pinions 18,19 of the first set. The two pairs of adjacent pinions 18,24; 19,25 are biased away from each other by two spring washers 28 mounted on the shaft 12.

In order to allow the support 6 to be clamped to the bracket 1, the shaft 12 is formed with a head 30 at one end which bears against a slide block 31 rotatably mounted on the shaft and slidably received in the vertical slot 5 in the side wall 3 of the bracket 1. The other end of the shaft 12 is threaded and projects out of the vertical slot 4 in the other side wall 2 of the bracket 1.

A handle 32 is rotatably mounted on the threaded end of the shaft 12 and is retained thereon by a washer 33, a castellated nut 34, and a split pin 35. The face of the hub of the handle 32 adjacent the side wall 2 is formed with a projection 36 which extends diametrically across the face. The projection 36 engages with a cam surface 37 formed on a slide block 38 received in the vertical slot 4 in the side wall 2. The cam surface 37 includes two circumferentially spaced recesses 39,40 of complementary shape to the projection 36 which are spaced along the axis of the shaft 12 so that, as the handle 32 is rotated about the axis of the shaft 12 an axial compressive force is applied between the slide blocks 31 and 38 via the shaft 12.

In operation, when the handle 32 is in the position illustrated in the drawing, a relatively small axial force is applied between the slide blocks 38 and 31. This force is insufficient to overcome the forces exerted on the two pairs of pinions 19,25; 18,24 by the spring washers 28,29. The serrations 26,21,20,27 are therefore out of engagement with each other. The driver is free to move the support 6 into any desired position within the limits permitted by the slots 4,5 and 7. Nevertheless, the pressure exerted at the pinions by the spring washer is sufficient to provide a small resistance to the movement of the support 6 so that the driver must make a positive effort to effect the adjustment. During the adjustment, movement of the support 6 in the direction of the slot 7 causes the pinions 24,25 of the second rack and pinion set to roll relative to the racks 22,23. Movement of the support 6 in the direction of the slots 4,5 causes the pinions 18,19 of the first rack and pinion set to roll relative to the racks 16,17. Since the racks 20,21 lie on opposite sides of the slots 4,5, movement of the support in the direction of the slots 4,5 causes the pinions to rotate about the shaft 12 in opposite directions.

When the driver has selected a desired position, the handle 32 is rotated in the direction of the arrow 48. This causes the projection 36 on the handle 23 to ride up the cam surface on the slide block 37 and to engage in the recess 40, applying a higher axial compressive force to the slide blocks 31, 38. This compressive force is transmitted through the side walls 2,3 of the bracket to the pinions 18,19,24,25 and is sufficient to overcome the bias of the spring washers 28. The frictional force opposing movement of the outer end faces of the pinions 18,19 of the first set over the inner surfaces of the side walls 2,3 of the bracket 1 is increased. Similarly, the frictional force opposing movement of the inner end faces of the pinions 24,25 of the second set and the sides of the support 6 is also increased. Additionally, the serrations 20,21 on the pinions 18,19 of the first set engage with the serrations 26,27 on the pinions 25,26 of the second set. As a result movement of the pinions 18,19,25,24 relative to each other and relative to the bracket 1 and the support 6 is resisted. Furthermore, since movement of the support 6 in the direction of the slots 4,5 tends to cause rotation of the pinions 18,19 in opposite directions, the support 6 is locked in position.

The embodiment of the invention described above therefore provides a mounting for an adjustable steering column which is capable of applying a clamping force to the support 6 which is sufficiently high to prevent movement of the support 6 relative to the bracket even when high impact loads are applied to the steering column.

I claim:

1. A mounting for an adjustable steering column comprising a support for rotatably carrying a column member, a bracket carrying the support, the support being movable relative to the bracket in two mutually perpendicular directions, and clamping means for clamping the bracket to the support, characterized in that two rack and pinion sets are connected between the bracket and the support such that movement of the support relative to the bracket in each of the mutually perpendicular directions causes the pinions to roll relative to racks of respective rack and pinion sets with frictional forces opposing the relative movement of the racks and pinions and in that the clamping means increases the frictional forces opposing the relative movement of the racks and pinions.

2. An assembly according to claim 1 wherein a surface of the pinion of a first rack and pinion set bears directly or indirectly against a surface of the bracket and a surface of the pinion of a second rack and pinion set bears directly or indirectly against a surface of the support, and the clamping means increases the frictional force between the pinions and the corresponding bracket or support.

3. An assembly according to claim 1 or claim 2 wherein surfaces of the pinions of each rack and pinion set are arranged to bear directly or indirectly against each other and the clamping means increases the frictional force between the surfaces.

4. An assembly according to claim 3 wherein each rack and pinion set includes two racks and two pinions, and the pinions of at least one set are arranged to roll in opposite directions relative to their respective racks upon relative movement of the support and the bracket.

5. An assembly according to claim 4 wherein the said surfaces of the pinions carry radial serrations.

6. An assembly according to claim 5 wherein the pinions are biased away from each other.

7. An assembly according to claim 6 wherein the pinions of the rack and pinions sets are mounted on a common shaft slidably received in mutually perpendicular slots in the bracket and the support respectively.

* * * * *